C. T. MASON.
IGNITION DYNAMO.
APPLICATION FILED NOV. 21, 1912.

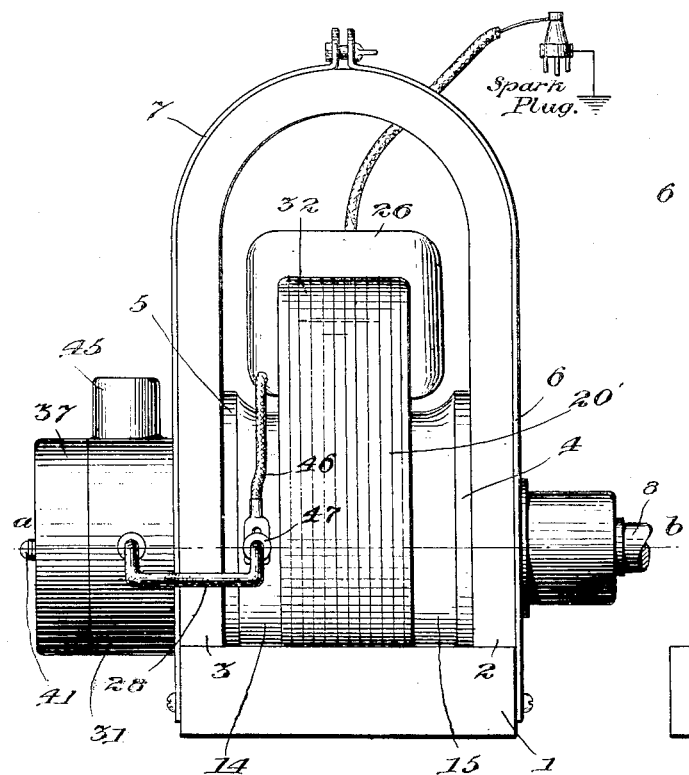

1,205,770.

Patented Nov. 21, 1916.
2 SHEETS—SHEET 2.

Witnesses
C. S. Grumman,
H. Löwenstein

Inventor
Charles T. Mason.

By H. R. VanDeventer,
Attorney

UNITED STATES PATENT OFFICE.

CHARLES THOMAS MASON, OF SUMTER, SOUTH CAROLINA, ASSIGNOR, BY MESNE ASSIGNMENTS, TO SPLITDORF ELECTRICAL COMPANY, OF NEWARK, NEW JERSEY, A CORPORATION OF NEW JERSEY.

IGNITION-DYNAMO.

1,205,770.  Specification of Letters Patent.  Patented Nov. 21, 1916.

Application filed November 21, 1912. Serial No. 732,681.

*To all whom it may concern:*

Be it known that I, CHARLES THOMAS MASON, a citizen of the United States, residing at Sumter, in the county of Sumter and State of South Carolina, have invented certain new and useful Improvements in Ignition-Dynamos, of which the following is a specification, reference being had to the accompanying drawing.

My invention relates to ignition dynamos, commonly called magnetos, and consists of an improved design whereby the magneto is composed of several unit groups that may be readily separated from each other, thereby facilitating testing and repair.

A further object is to construct and assemble the several parts so that increased efficiency is secured while the cost of manufacture is considerably lessened.

Figure 3:
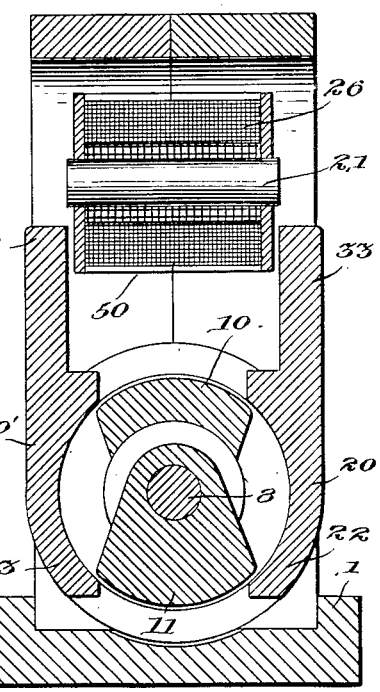
Figure 4:
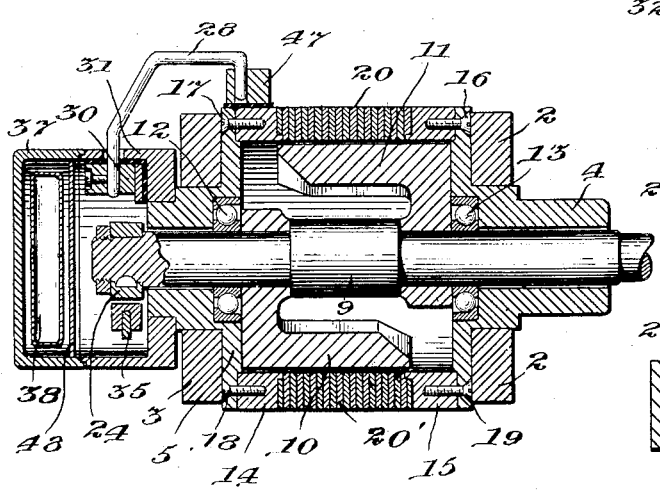
Figure 5:
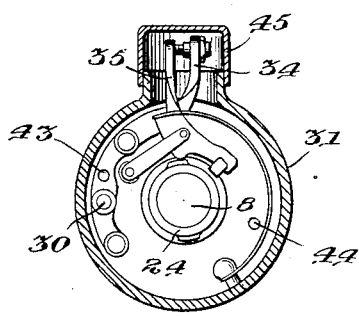
Figure 6:
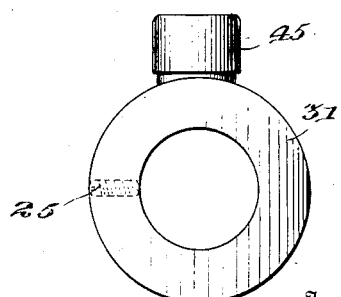

In the accompanying drawings, Figure 1 is a side view of a magneto embodying my invention. Fig. 2, an end view of the same. Fig. 3, a view, partly in section, with the winding lifted from the field structure, showing how the windings are removed. Fig. 4, a sectional view on the line *ab*, Fig. 1. Fig. 5, a front view of the interrupter mechanism, and Fig. 6, a rear view of the same. Fig. 7 is a view of the interrupter mechanism with cover in place showing condenser in the cover.

The same figures of reference denote the same parts wherever they are shown.

The magneto consists of a base, a field magnet and an armature structure with a removable winding, and an interrupter mechanism, or breaker box, all independent structures or parts, so assembled that they may be easily separated. I assemble these elements so that when the complete magneto is mounted for use, such as on an automobile motor, the parts may be easily removed and replaced.

1 denotes a base of non-magnetic material such as commonly employed. This is usually bolted or otherwise permanently attached to the engine frame; or may be integral therewith. This base is not attached to any part of the magneto, but supports the field magnets shown in Fig. 2, which consist of two U shaped permanent magnets, the ends 2 and 3 of which are shaped as shown, so that when placed edge to edge, a bearing is formed in the cut-away portions for the shoulders of the end plates 4 and 5 of the armature structure comprising the parts 4, 5, 14, 15, and laminations 20 and 20' which inclose the rotor composed of the parts 8, 9, 10 and 11.

The field magnet surrounding and inclosing the ends of the armature structure and supporting same, is held to the base by means of the clamps 6 and 7, or in any other suitable manner, from which it is evident that the magnets and the structure they support, may be removed from the base without removing the base from the engine bed; and yet as the base is milled to accurately receive the end of the magnets, the accurate replacement of the magnets on the base, and consequently the accurate positioning of the shaft 8 of the rotor, is assured.

The armature core structure, which also forms a housing for the rotor, is shown in section in Fig. 4, and consists of two groups of laminæ shown at 20 and 20', adjacent the sides of which are the rings 14 and 15 of non-magnetic material, such as brass. Against these are placed the end plates 4 and 5, which are of magnetizable material. Supported by these end plates and free to rotate on the ball bearings 12 and 13 therein, is the shaft 8 of brass or other non-magnetic material, carrying two rotor elements 10 and 11, of suitable magnetizable material, which being in continuous magnetic connection through the end plates 4 and 5 with the ends of the magnet, no air gaps intervening really form rotating polar extremities of the magnet; these are practically the ends of the magnet brought together and made revoluble.

The heads of the rotors 10 and 11 adjacent end plates 4 and 5, are made as close a fit as possible, eliminating air gaps, and the ball bearings 12 and 13 being of magnetic material, further serve as a flux conducting means between the end plates and the rotor. The races of said bearings are confined between abutments formed on said rotatable members 10 and 11 and the members 4 and 5 of the field structure. The shaft 8 may be of a magnetic material in which case the two portions of same carrying the rotors must be separated by non-magnetic material at the center 9. But preferably the shaft is of bronze or other non-magnetic material so that it and the center portion may be integral, as shown in the drawing.

As the two rotors and their associated end plates must be magnetically separated from each other, and the cores 20 and 20′, the screws 16, 17, 18 and 19 should be non-magnetic.

It will be seen from the foregoing that each end plate and rotor are magnetically in contact with each other, the extremities of the magnetic poles being the tip of each rotor farthest away from its neighboring end plate. This makes, when the north pole 3 of the magnets embraces the shoulder of end plate 5, rotor 10 the rotating polar extremity of the north pole of the magnet, while rotor 11 is the rotating polar extremity of the "S" or opposite pole 2. These rotating polar extremities always have the same polarity, and do not reverse during a revolution, as is the case with rotors arranged as heretofore.

It is essential that the rotors 10 and 11 be inclosed and closely embraced by the ends of the permanent magnet, the ends of which should extend below the path of travel of the rotors. Furthermore the end plates 4 and 5 should be reduced in thickness so as to bring the ends of the rotors in close proximity to the inner faces of the magnet so there will be large adjacent surfaces of the magnet and rotors connected through the end plates and thereby virtually in direct magnetic relation with each other.

It is desirable to have the windings carried by the armature core so arranged that they may be removed as a unit without disturbing the other parts. This I accomplish by providing the windings with a core 21 which is a close fit between the extensions 32 and 33 of the pole shoes 22 and 23 of the laminæ 20 and 20′, and the coil may therefore be removed by simply pulling it out. If desired it may be fixed in place by screws, although if it is properly fitted this is unnecessary so far as securing a good magnetic circuit is concerned.

As a condenser is commonly employed in connection with the primary winding of a high tension magneto, this condenser may be placed in any suitable position, such as shown at 50, (in Fig. 3) being wrapped around or attached to the windings, and being connected across the primary winding or in any suitable manner. One terminal of the condenser is grounded on the frame of the machine, while the other terminal is connected by means of a conductor to the insulated terminal 47 mounted on the armature structure, 47 being also connected to terminal 30 of the interrupter mechanism by conductor 28, and to the primary winding by conductor 46. The other end of the primary winding being grounded. Circuit arrangements of this character being well known, I do not show same. The preferred arrangement, however, for the condenser, is shown in Fig. 7. Here 37 represents a stamped cover forming the end of the casing 31 of the interrupter. The condenser 38 is connected to two metal eyelets or tubes, which form condenser terminals. These tubes are shown at 39 and 40, and are insulated from the cover 37 by suitable bushings, as shown. Through the tubes pass screws 41 and 42, which connect the condenser in circuit in the proper manner, for instance 41 connecting one side of the condenser to the contact piece 34, in which is the threaded hole 43 to receive it, while screw 42 enters the hole 44 in the casing 31. This connects the condenser in circuit across the interrupter points 34 and 35 and in multiple with the primary of the coil 26.

The interrupter or "breaker box" unit may be of any suitable construction, and consists of a casing 31 having an annular opening so as to slide on the projecting shoulder of the end plate 5, so the shaft 8 carrying the cam 24 may project into the casing. The box as a whole is clamped on 5 by the screw 25, or in any suitable manner, so that the box partakes of the movement of the armature structure as it is moved in the magnet structure. It will be observed that by moving the armature structure, the timing can be advanced and retarded without weakening the spark. This is an additional reason for making this structure movable, as well as having it readily removable, and is a desirable feature I accomplish without complicating the construction, which is necessary in other types when the same intensity of spark is necessary at all positions of timing.

The cam 24 operates the interrupter mechanism, which consists of one movable contact piece 35 normally resting on the fixed contact piece 34 which is insulated from the box 31 in any suitable manner. Terminal 30 is connected to the fixed contact piece 34 of the breaker.

In other magnetos, especially in machines having the windings on a rotating armature, the easy location of trouble, or the replacement of worn parts is often attended with much difficulty, and is practically impossible to the unskilled. This is particularly true where the magneto is located in an inaccessible position, such as it commonly occupies in the average automobile. These difficulties are eliminated to a great extent in my arrangement.

The operations of testing, etc., are carried out substantially as follows: Should the magnets be suspected of weakening, the coil may be removed, and by placing a piece of iron across the ends 32 and 33 of the core and moving the rotor, the variation in the magnetic pull and the consequent strength of the magnets is readily ascertained without removing them and without removing the magneto entire from the engine, as must be done with other types. Should the windings be suspected, the method of their removal and the substitution of a new set is obvious from an inspection of Fig. 3, and it will be noted that this can be accomplished without the necessity for mechanical skill or tools necessary to remove and replace the windings in many other machines.

The complete breaker box may be removed by loosening the screw 25 and the screw securing conductor 28 in terminal 30, and pulling the box off the shoulder on the end plate 5. In the peculiar form of breaker I employ, this is seldom necessary as the contact points 34 and 35 are easily seen and adjusted by removing the cap 45.

Should the condenser require attention, it is easily removed by loosening screws 41 and 42. The condenser unit consists of the condenser 38, the cover 37, and the bushings 39 and 40 with their insulation. The condenser is preferably sealed in the cover with suitable compound, and an inner partition 48 is provided for preventing ingress of oil or mechanical damage.

It is obvious that there being no wire connections of any sort between the rotor and other parts, the rotor will seldom require attention; but in case it does, it may be easily removed and replaced without the danger of injuring the coils or condenser— a danger always present in magnetos where these parts are placed in the armature structure or its housing. All brushes and other sliding connections are eliminated.

To insure the maximum electrical efficiency in a machine of this type, I find it essential that the ends of the U shaped magnet must extend below the line AB Fig. 1, so as to embrace endwise, the circumferential path of travel of the rotor so that as large an end surface of the rotors will be practically in as direct contact with the ends of the magnet, as possible, only the thickness of the pole pieces 4 and 5 intervening. By this construction, the parts of the rotors become the true polar extremities of the magnet, thereby conveying a stronger flux to the pole shoes 22 and 23 of the armature core structure than would be the case if the ends of the magnet stopped above the line AB Fig. 1, as the latter arrangement would necessitate the magnetic flux having to pass from the magnet ends through an intermediate magnetic element before reaching the rotor proper; or the flux would pass into the rotor from the narrow end or edge of the magnet instead of from the broad internal face thereof. This method of having the magnet itself embrace the rotor, is a feature I deem of great importance.

The electrical operation of a magneto of this character is as follows, from which it will also be seen how my improved construction results in increased efficiency: Considering 3 to be the north end of the magnet, end plate 5 is of course of the same polarity. As rotor 10 is in close contact with 5 it is of the same polarity and remains so, regardless of any position in which it may be. Rotor 11 being in contact with end plate 4, in contact with the "S" end 2 of the magnet, is of opposite polarity to 10. As the rotor is revolved, alternate polarities of magnetic flux are carried to the pole shoes 22 and 23, the same as if a magnet were revolved before them. During each revolution, when the rotors are in the position shown in Fig. 3, the pole shoes are magnetically short circuited, and a reversal of flux takes place; this generates a current in the coil on core 21, and in synchronism with this, the interrupter contacts 34 and 35 are operated, thereby opening the primary circuit and producing a flow of induced current in the secondary which is available for ignition purposes. The rotors 10 and 11 each having a portion parallel to the flux lines from the magnet, and ends embraced by the actual extremities thereof, gather the flux and transfer it more quickly and with less loss and lag than with the parts in any other relative position; and while it requires a high degree of skill and special machinery to accurately form the apertures in the magnet for holding the core structure, as shown, and to grind the internal faces of the magnet to a close fit on 4 and 5, this is necessary to secure the desired efficiency. I have shown a substantially U shaped magnet but it is obvious that the magnet may be of any shape, and can be of the electro-magnetic type. And while I have shown a high tension magneto with two windings, an interrupter and condenser, it is obvious that this construction is available for a machine having one or a number of windings.

The number of rotor members may be increased if desired, thereby obtaining more than two impulses per revolution, and various other obvious modifications may be made without departing from the invention herein described and claimed.

I claim:

1. In a dynamo for ignition, a U-shaped magnet, an armature structure movably positioned between the ends of said magent and supported thereby, laminations in said structure forming two circumferential oppositely positioned pole shoes, a rotor inclosed by said armature structure, a winding and a core therefor removably mounted on said armature structure, a condenser carried by said armature structure and movable therewith, a shoulder on said armature structure projecting through one of the poles of said magnet, and interrupter mechanism carried by said shoulder.

2. A dynamo for ignition comprising a base, a magnet, an armature structure carried by said magnet, end members on said armature structure projecting through said magnet parallel with flux lines therefrom, bearings in said end members, a rotor shaft carried in said bearings and projecting through said magnet ends, rotors carried by said shaft forming polar extensions of said magnet, and laminated portions on said armature structure forming circumferential pole shoes adjacent the path of travel of said rotors and at right angles to the magnet flux lines.

3. A magneto electric machine comprising a field structure having rotatable poles and an armature structure comprising a pair of pole shoes mounted in juxtaposition to said rotatable pole pieces and fixedly connected together, and an armature core normally bridging said armature pole pieces but freely removable therefrom, and a winding carried by said core member.

4. A magneto electric machine comprising a field structure having rotatable inductor pole pieces, an armature structure mounted for angular adjustment as respects said rotatable pole pieces and comprising a pair of magnetically insulated pole shoes and a magnetic armature core connecting said pole shoes but freely removable therefrom, together with an armature winding carried by said core.

5. A magneto electric machine comprising a field structure having rotatable inductor poles of permanent and opposite magnetic polarity, and an armature structure comprising a pair of pole shoes rigidly connected together but magnetically insulated from each other, a core of magnetic material connecting the upper ends of said pole shoes, said core being freely removable therefrom, and an armature winding carried by said core, the said armature structure being mounted for angular adjustment about the axis of said rotatable field poles.

6. A magneto electric machine comprising a field structure having rotatable inductor poles, and an armature structure angularly adjustable with respect to said rotatable poles, and comprising a pair of spaced armature pole shoes, a frame of non-magnetic material connecting the same together at their lower ends, a core of magnetic material removably mounted between said pole shoes at their upper ends, an armature winding on said core and bearing connections between a fixed part of said field structure and said non-magnetic frame whereby the said armature structure may be adjusted angularly and bodily around the axis of said rotatable inductor poles.

7. A magneto electric machine comprising a field structure having rotatable inductor poles of permanent and opposite magnetic polarity and a stationary main body portion, ball bearings between said stationary portion of the field structure and said rotatable field poles, the balls and races of which are composed of magnetic material whereby the flux is conducted from said stationary portion of the field structure to said rotatable field poles by said bearings, and an armature structure mounted in coöperative relation to said field poles, and normally stationary with respect thereto.

8. A magneto electric machine comprising a field structure having rotatable inductor pole pieces which are embraced by a member included in the magnetic circuit of the field, and flux conducting ball bearings having ball races which are confined between opposite abutments formed on said rotatable pole pieces and a portion of said member respectively, together with an armature structure mounted in coöperative relation with said rotatable field poles.

9. A magneto electric machine comprising a U-shaped permanent magnet and rotatable inductor poles embraced thereby in end-wise relation and ball bearings between the ends of said inductor poles and the inner face of said permanent magnet, the parts of which bearings are held together within the embrace of said magnet.

10. A magneto electric machine comprising a field structure having a normally stationary main body and associated rotatable inductor poles, flux conducting ball bearings intermediate said stationary and rotatable members, and a normally stationary armature member mounted in juxtaposition to said rotatable inductor field poles.

11. A magneto electric generator comprising field and armature members, constructed of magnetic material to form closed paths for the magnetic flux, one of said members having a rotatable element forming a part of said magnetic circuit, and flux conducting ball bearings maintaining the continuity of the magnetic path between said rotatable element and the associated fixed element.

12. In a dynamo electric machine, relatively fixed and rotatable magnetic members, a flux conducting ball bearing between said members, and an armature winding in inductive relation to the rotatable one of said members.

13. A magneto electric machine comprising armature and field members, one of which is fixed and the other rotatable, the rotatable one of said members comprising a shaft having a central enlarged portion forming shoulders upon the main body of the shaft, and inductor members fitted over the ends of said shaft and abutting said shoulders, together with means on said fixed member holding said inductor members in place.

14. A magneto electric machine comprising a U-shaped field magnet, a transversely extending shaft of non-magentic material journaled in apertures in the poles of said field magnet, said shaft having a central enlarged portion forming shoulders, inductor poles mounted on opposite ends of said shaft and embraced between said shoulders and the inner faces of said permanent magnet, and an armature structure and winding in juxtaposition to said inductor poles.

15. A magneto electric machine comprising a permanent field magnet, an armature structure mounted betwen the poles of said field magnet and comprising a pair of spaced pole shoes, a frame of non-magnetic material separating said pole shoes from the poles of said field magnet, magnetic end plates for said frame having laterally projecting sleeves journaled on an axis passing through the poles of said field magnet, internal shoulders formed in said end plates concentric with said axis, a shaft of non-magnetic material located on said axis, means forming shoulders on said shaft, inductor poles mounted on the opposite ends of said shaft and bearing against the said shoulders, and flux conducting ball bearings seated between the said internal shoulders of the end plates of the armature structure and the said inductor poles.

16. A magneto electric machine comprising a field structure and a coöperating armature structure, one of said structures having a rotatable inductor member comprising a transversely extending shaft journaled on an axis passing through fixed poles thereof but separated therefrom and inductor poles mounted on said shaft, and flux conducting ball bearings by which said shaft is supported upon its axis and through which the flux is conducted from the stationary structure to the poles of said inductor member.

17. A magneto electric machine comprising a U-shaped permanent magnet, a rotable inductor embraced in an end-wise position between the poles thereof and having a shaft journaled on an axis transversely of said poles, an adjustable armature structure coöperating with said inductor, circuit controlling apparatus mounted adjacent said shaft of said inductor exteriorly of one pole of said magnet, and an electrical conductor rigidly connected at one end with said armature structure and at the other end with said circuit controlling apparatus.

18. A magneto electric machine comprising a U-shaped permanent magnet, a rotatable inductor embraced in an end-wise position between the poles thereof and having a shaft journaled on an axis transversely of said poles, an adjustable armature structure coöperating with said inductor, circuit controlling apparatus mounted adjacent said shaft of said inductor exteriorly of one pole of said magent, and an electrical conductor rigidly connected at one end with said armature structure and at the other end with said circuit controlling apparatus, said conductor extending around the outer edge of said permanent magnet, and occupying a position separated therefrom by an air space.

19. A magneto electric machine comprising a U-shaped permanent magnet, a rotatable inductor embraced in an end-wise position by the poles thereof and journaled on an axis transversely of said poles, circuit controlling apparatus on the exterior of said magnet poles operated from said rotatable inductor, a condenser connected with and supported by said circuit controlling apparatus, and an armature structure in juxtaposition to said inductor and embraced by said field magnet structure.

20. A magneto electric machine comprising coöperating relatively rotatable armature and field members, circuit controlling apparatus surrounding one end of the axis of the rotatable one of said members and operated by said rotatable member, and a condenser connected with said circuit controlling apparatus and supported thereby in a position opposite one end of said axis, together with driving means for said rotatable member on the opposite end of said axis.

In testimony whereof I hereunto affix my signature in the presence of two witnesses.

CHARLES THOMAS MASON.

Witnesses:
F. C. MANNING,
H. R. VAN DEVENTER.